United States Patent [19]

Gordon et al.

[11] Patent Number: 4,843,566
[45] Date of Patent: Jun. 27, 1989

[54] ROBOT MOTION CONTROL SYSTEM

[75] Inventors: Gary B. Gordon, Saratoga; Joseph C. Roark, Menlo Park, both of Calif.

[73] Assignee: Hewlett-Packard Company, Palo Alto, Calif.

[21] Appl. No.: 188,658

[22] Filed: Apr. 29, 1988

Related U.S. Application Data

[63] Continuation of Ser. No. 837,614, Mar. 7, 1986, abandoned.

[51] Int. Cl.[4] .............................................. G06F 15/46
[52] U.S. Cl. .................................... 364/513; 364/192; 901/3
[58] Field of Search .......................... 364/513, 191–193, 364/171, 188, 189; 901/3; 318/568

[56] References Cited

U.S. PATENT DOCUMENTS

| | | | |
|---|---|---|---|
| 4,456,961 | 6/1984 | Price et al. | 364/513 |
| 4,484,286 | 11/1984 | Nagamine et al. | 364/474 |
| 4,521,860 | 6/1985 | Kanematsu et al. | 364/191 |
| 4,543,639 | 9/1985 | Iraba et al. | 364/513 |
| 4,586,151 | 4/1986 | Buote | 364/513 |
| 4,606,001 | 8/1986 | Rubin et al. | 364/192 |
| 4,633,385 | 12/1986 | Murata et al. | 364/513 |
| 4,636,938 | 1/1987 | Broome | 364/191 |

OTHER PUBLICATIONS

"AL Users' Manual", Shahid Mujtaba and Ron Goldman, Stanford Artificial Intelligence Laboratory, Memo AIM-323, Computer Science Dept. Report No. STAN-CS-79.718, Jan. 1979.

"AR-BASIC Technical Specifications", an information sheet by American Robot Corporation of Pittsburgh, Pa.

Preliminary Draft No. 3 of "User's Guide to VAL-II, The Unimation Robot Programming and Control System", version X2, Apr. 1983, Unimation Inc., Danbury, Conn.

"Robotics Software Systems", Robotics and Computer-Integrated Manufacturing, vol. 2, No. 1, pp. 1–12 by M. C. Leu, Cornell University, 1985.

Primary Examiner—Allen MacDonald

[57] ABSTRACT

A system for controlling a mechanical manipulator in a laboratory environment employs a system of taught motions, attribute operators and procedure rules to simplify the programming task for scientists or engineers skilled in their own fields and not robotics.

19 Claims, 5 Drawing Sheets

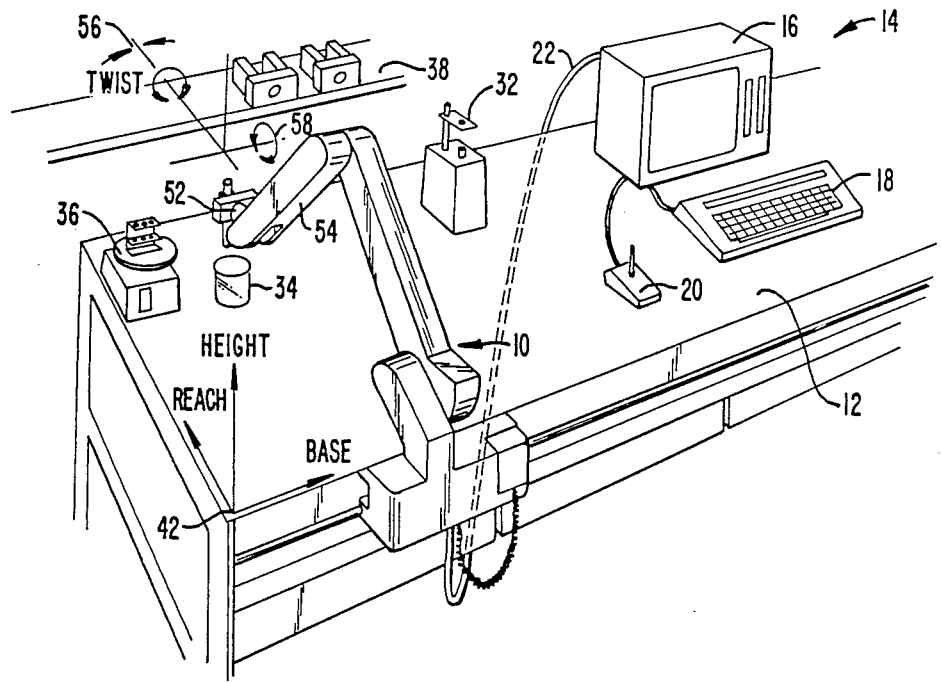
FIG._1.
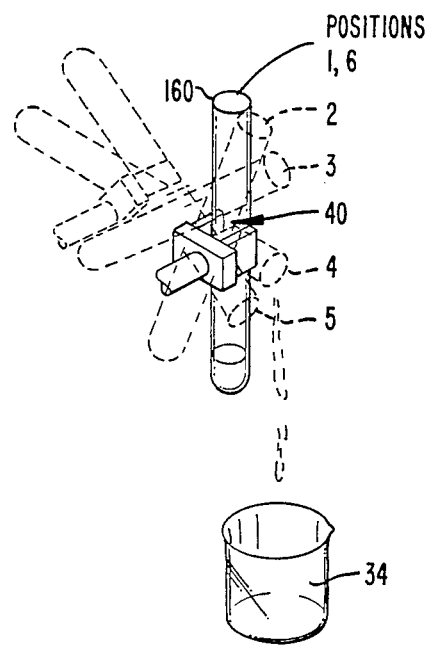
FIG._3.

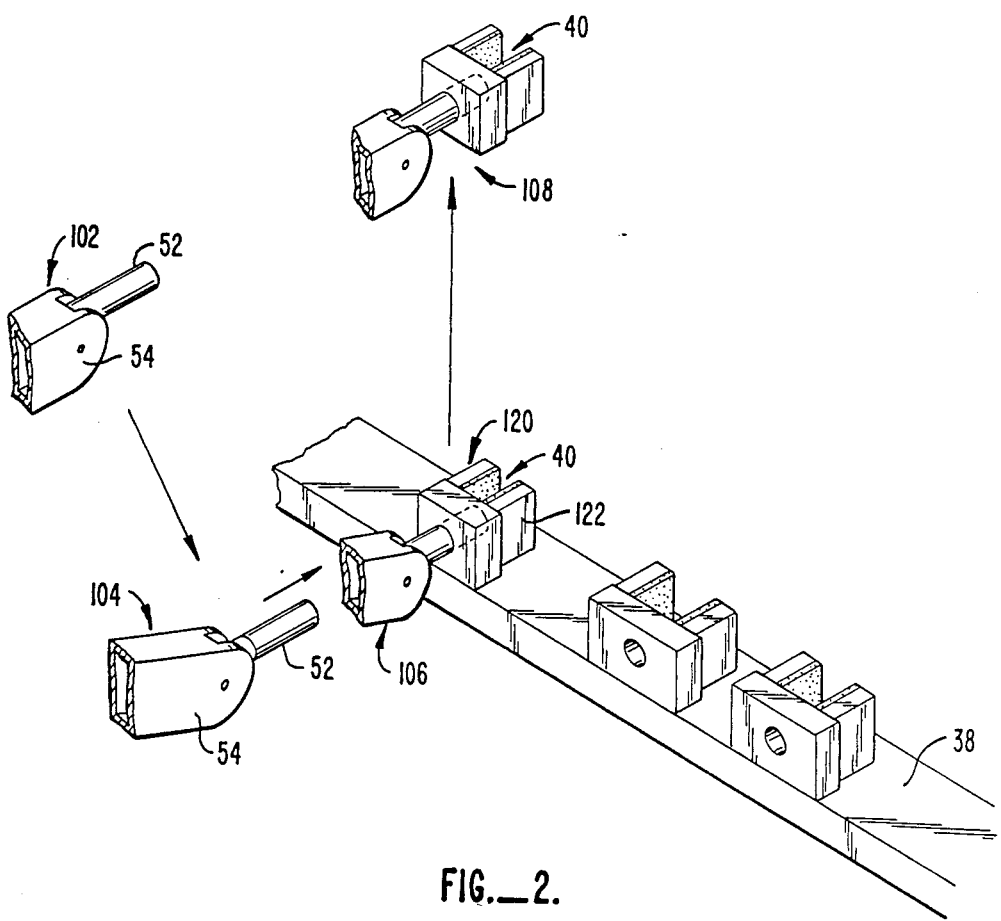
FIG._2.

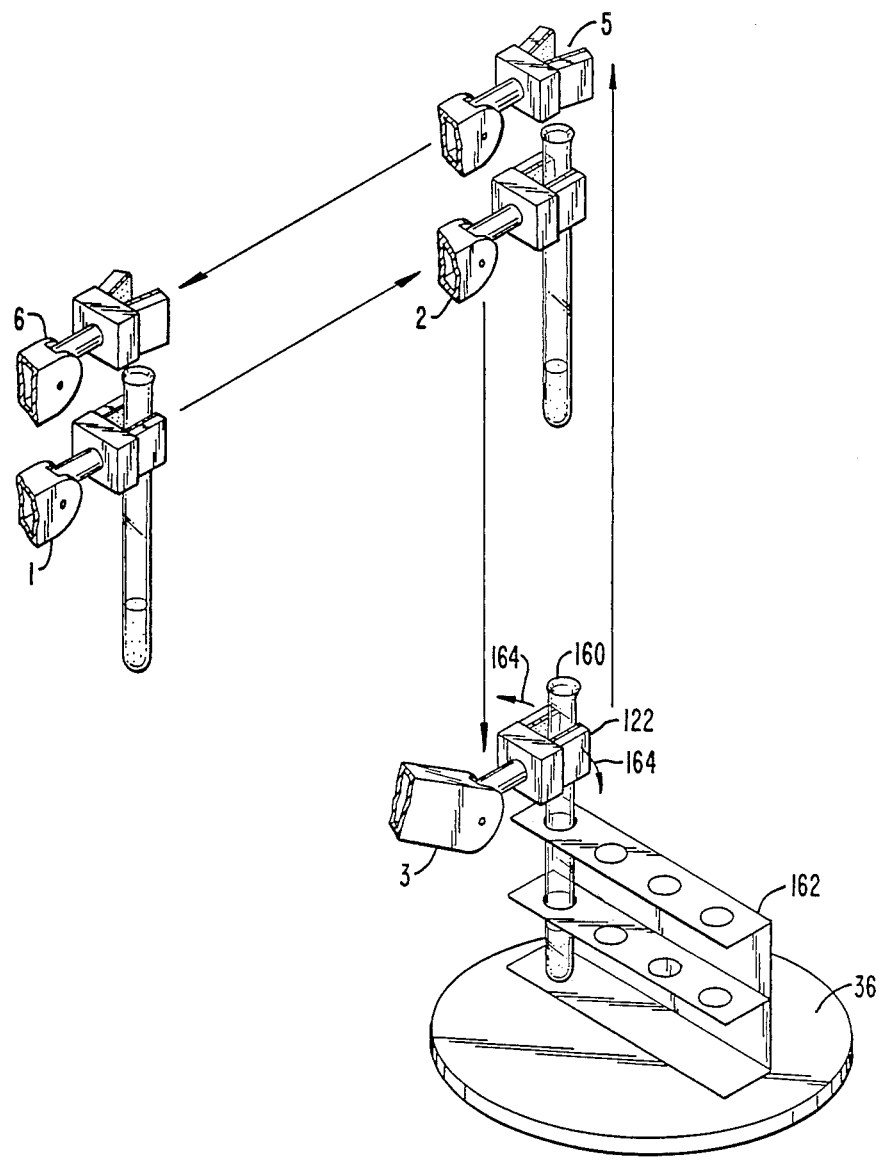
FIG._4.

FLOW CHARTS
I. MOTION DEFINITION (CREATION)
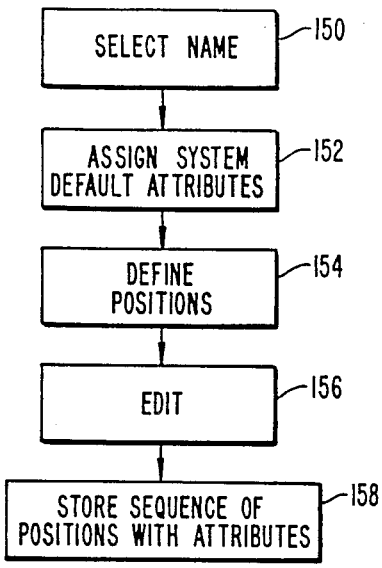
II. MOTION EDITING
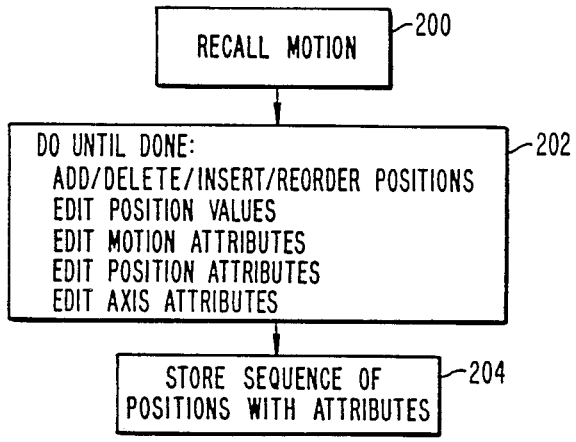
III. PROCEDURE EDITING TO COMBINE MOTIONS, SET PROCEDURE ATTRIBUTES, AND APPLY ATTRIBUTE OPERATORS
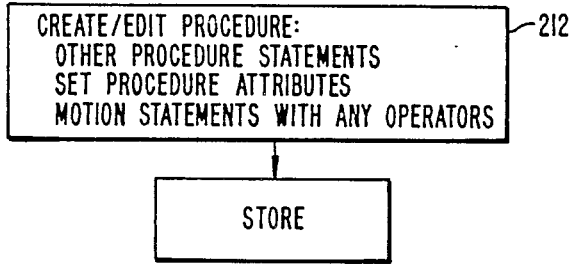
FIG._5.

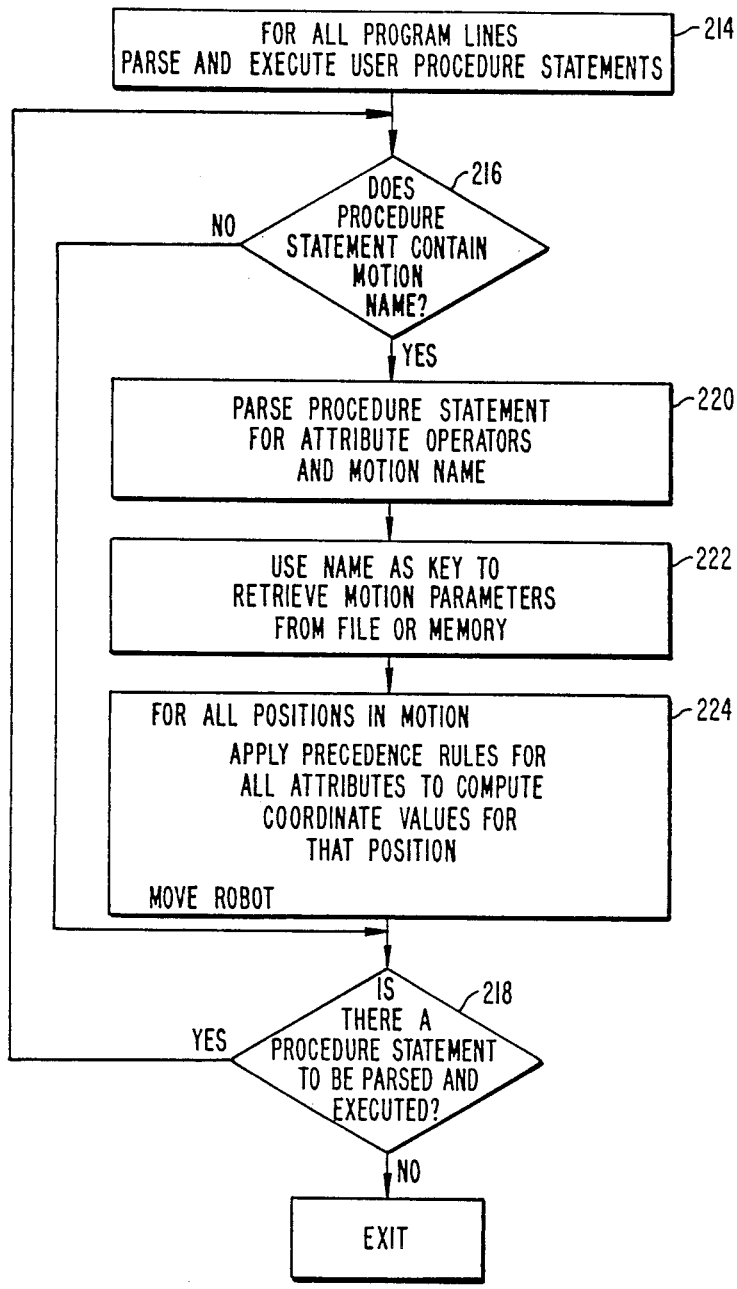
FIG._6.

ROBOT MOTION CONTROL SYSTEM

CROSS REFERENCE TO RELATED APPLICATION

This application is a continuation of application Ser. No. 837,614, filed Mar. 7, 1986, now abandoned.

BACKGROUND OF THE INVENTION

This invention is related in general to robotic devices and in particular to a robot motion control system.

Robots have been used in manufacturing for a number of years. One of the most common uses for robots in the manufacturing context is to perform repetitive motions such as moving objects from one place to another in the assembly process. This type of application is referred to as "pick and place". Over the past two decades, a progression of robot motion control languages have been developed to allow for simpler and more capable programming. These robot motion control languages can be classified into three categories (M. C. Leu, Cornell University, "Robotics Software Systems", Robotics & Computer-Integrated Manufacturing, Vol. 2, No. 1, pp. 1-12, 1985). They are Joint Level, Manipulator Level, and Task Level. Examples of each follow:

| Joint Level | Manipulator Level | Task Level |
| --- | --- | --- |
| ML (IBM) | WAVE (Stanford) | AL (Stanford) |
| ARMBASIC (Microbot) | AL (Stanford) | Autopass (IBM) |
| EasyLab (Zymark) | PAL (Purdue) | LAMA (MIT) |
| VAL (Unimation) | RAPT (Edinburgh U.) | |
| AML (IBM) | | |
| RAIL (Automatix) | | |
| MCL (McDonnell) | | |
| RCL (SRI) | | |
| AR-BASIC (American Robot) | | |

Robot teaching methods can also be classified into two categories. These are, as Leu says, textual and nontextual. Most robot control languages allow for both teaching techniques. In no-textual teaching, the robot motions are taught by the user with the aid of a teach pendant. This device is a hand-held unit consisting of buttons, switches, and other control means as well as feedback means from the robot controller. The user is able to control and robot's motion and store robot positions using this device. In textural teaching, all robot motions are defined explicitly using position information gathered from an object location and geometry data base or from a calculation process.

The primary advantage of non-textual teaching is its simplicity and reliability. The user simply shows the robot where to go and how to get there. Collisions are essentially impossible. The main disadvantage with this teaching technique with current programming languages is the difficulty in editing and documenting the program. The primary advantage of textual teaching is in its ability to edit and document robot control programs. However, textual teaching techniques alone suffer from a difficulty in defining locations of the objects in the workcell. Most languages combine textual and non-textual teaching techniques to minimize programming effort. Nonetheless, existing languages are often cumbersome because of the lack of a simple mechanism for grouping together sequences of positions to form entire motions.

Joint level languages are quite limited in capability because of their lack of knowledge of actual positions in the workcell. The only thing they known is the position of the joints (axes) of the robot. It is both difficult and dangerous to modify a motion in this type of language.

Manipulator Level languages allows the user to program a task in terms of a sequence of robot motions represented by the end-effector locations. Since the language deals directly with actual positions and orientations of the end of the arm, it is readily possible to modify the execution of particular sequences of positions with the use of modifiers. Most commercial languages are of this type.

Task level languages are the highest, and most capable of all robot control languages because the user programs the task in terms of states of the world, not robot motions. The robot system determines how the robot is to move to accomplish a desired task. The main disadvantage with this type of language is that it requires an accurate model of the world. This model must be generated from a data base since direct input from the user via the keyboard is impractical for such a large volume of data. For most applications, especially those found in the laboratory, a data base describing the geometry of all objects in the robot's workcell is not available. For this reason, task level languages are not practical in the laboratory.

As listed in the table above for the three level of languages, examples of manipulator level languages are (1) and AL system as described in "AL Users' Manual" by Shahid Mujtaba ad Ron Goldman, Stanford Artificial Intelligence Laboratory, Memo AIM-323, Computer Science Department Report No. STAN-CS-79-718, January, 1979, (2) AR-BASIC(R) by American Robot Corporation of Pittsburgh, Pa. and (3) VAL-II System by Unimation Inc. of Danbury, Conn. In these systems, the approach taken is to dissect a robot motion into a sequence of points. To further define the robot motion, attributes such as the speed of the motion between points is specified on a point by point basis. In other words, if the robot is to move from one point to the next point of the motion, the speed of the motion is specified for the interval between such points. This can become tedious for the user especially if long sequences of positions are being modified by the same modifiers, which is often the case.

None of the above-described system are entirely satisfactory. It is therefore desirable to provide a robot motion control system in which many of the above-described difficulties are alleviated.

SUMMARY OF THE INVENTION

The invention is based on the recognition that the factors or attributes governing robot motion between successive positions are just as important as the positions themselves. Furthermore, the same attributes such as speed , acceleration, force and the tools for moving aobjects are applied to many positions in the motion. Thus, the positions for the entire motion may be grouped together and the attributes that normally do not change throughout the motion specified as motion attributes. By enabling users to manipulate entire motions as a whoel, it is possible to greatly reduce the number of definitions.

The invention retains the advantage of a manipulator level languages since it offers the most capability possible without the complexity of a world model. On the other hand, by enabling the user to manipulate entire motions at a time, it greatly improves the users' ability to teach, edit, and document robot motion control sequences.

Thus, the method of this invention is for controlling a mechanical manipulator using a controller to cause named reusable motions of the manipulator. The manipulator defines an actuation point. The method comprises storing in the controller a procedure which includes an ordered sequence of motions. Each motion includes an ordered sequence of positions of the actuation point and a set of motion attributes. Each position in turn includes a set of coordinates. The method also comprises executing the procedure.

In the preferred embodiment, different levels of attributes may be specified. Thus, motion attributes which generally govern the entire motin may be modified or overriden by other types of attributes specified for a position, a coordinate, or a whole sequence of motions. Hence, in the preferred embodiment, provisions may be made for also storing in the controller a set of procedure attributes aassociated with the procedure, a set of coordinate attributes associated with the coordinates. The procedure, motion, position and coordinate attributes modify one another according to a predetermined rule for controlling the motion. The use of the different levels of attributes greatly enhances the flexibility and capability of the invention.

This invention is particularly advantageous for laboratory applications. Where in manufacturing robots perform repetitive pick-and-place operations, in the laboratory they are asked to perform more flexibly, much as a laboratory assistant. In the manufacturing environment it was acceptable for the programming method and language to be terse, as they were dealt with by robot specialists. In the laboratory, programming is performed instead by professionals skilled in chemistry or some other laboratory science, and not robotics. They need to be able to interact with the robot at the higher level of showing it what is to be done, rather than at the computer programming level. An analogy is the accountant programming a personal computer for his personal spread sheet with modern software such as Lotus 123, as opposed to programming it in COBOL. With the former, the present invention reduces and simplifies the task of teaching a robot, through the use of a high level programming approach, powerful attribute operators, and a system of easily-reusable code.

While this invention is advantageous for laboratory applications, it may also be advantageously used in manufacturing applications, such as where some flexibility is required or desirable.

BRIEF DESCRIPTION OF THE DRAWINGS

FIG. 1 is a perspective view of a robot in a laboratory setting and a robot control system to illustrate the invention.

FIG. 2 is a simplified schematic view of a sequence of positions of a portion of the robot instructed by the control system of FIG. 1 to get a robot tool to illustrate the preferred embodiment of the invention.

FIG. 3 is a simplified perspective view of a sequence of positions of a portion of a robot rotating a test tube in a pouring motion to illustrate the preferred embodiment of the invention.

FIG. 4 is a simplified perspective view of a sequence of positions of a portion of the robot for placing a test tube on a balance to illustrate the preferred embodiment of the invention.

FIG. 5 is a flow chart illustrating the steps for defining and editing robot motion and for parsing and editing procedure statements to illustrate the preferred embodiment of the invention.

FIG. 6 is a flow chart illustrating the steps for executing a procedure to illustrate the preferred embodiment of the invention.

DETAILED DESCRIPTION OF THE INVENTION

FIG. 1 is a perspective view of a robot in a laboratory workcell and a robot control system to illustrate the invention. As shown in FIG. 1 robot 10 is mounted onto a table 12. Robot 10 is controlled by a control system 14 comprising a controller 16, an input keyboard 18 and a pendant 20. Controller 16 is connected to robot 10 by cable 22.

The operation of robot 10 and control system 14 is as follows. Robot 10 is first taught to perform certain motions by control sytems 14. The teaching can be textual, that is, through input keyboard 18. In textual teachings, the different positions in a robot motion are gathered from object location and geometry data base or from a calculation process; such positions information is then typed on the keyboard 18 and stored in controller 16. Alternatively, non-textual methods using pendant 20 maybe used. In non-textual teaching, the user simply moves a joystick or control knobs of some kind on pendant 20 in order to move the robot to desired locations. By pressing certain buttons of the pendant, such desired robot positions are then stored in controller 16. Either type of teaching process is referred to below as motion definition or creation.

This invention is particularly advantageous for laboratory applications and robot 10 of FIG. 1 is shown in a laboratory setting for moving a test tube. As shown in FIG. 1, also placed on table 12 are a test tube rack 32, a beaker 34 and a balance 36. The functioning of the robot and control system 14 will be illustrated in an exemplary motion where robot 10 picks up a test tube from rack 32, pours the content of the test tube into beaker 34 and then places it in a test tube rack on balance 36. Before the motion is performed robot 10 is also instructed to get a particular robot hand or tool from a tool rack 38 where the tool is suitable for picking up a test tube.

The exemplary motion described briefly above consists of four motions: (1) getting a tool from tool rack 38, (2) picking up a test tube from rack 32 using the tool, (3) pour the contents in the test tube into beaker 34 and (4) placing the test tube in balance 36. The above four motions, as arranged in the particular order listed above, is referred to as a procedure herein. Each of the four motions may be further broken down into an ordered sequence of different positions of the robot 10. Robot 10 has an actuation point 40 shown more clearly in FIGS. 2 and 3.

Motions of robot 10 are defined by controller 14 by specifying the desired positions of the actuation point in reference to a Cartesian coordinate system whose origin may be conveniently chosen at a corner of the table 42. Obviously other coordinate systems may also be used for implementing the invention. The three axes of the coordinate system, as shown in FIG. 1, are base, height, and reach. Robot 10 has a wrist 52 which may be rotated with respect to the robot arm 54 about two axes 56 and 58. When wrist 52 is rotated about axes 56, the amount of rotation is referred to as twist below. Thus, robot 10 of FIG. 1 has five degrees of freedom and is a five-axes robot. It will be understood, however, that this invention is equally applicable to robots with a different number of degrees of freedom and axes and that such applications are also within the scope of the invention.

The motion of getting a tool will now be illustrated in reference to Table 1 below and to FIG. 2. As shown in Table 1, the motion GET.TOOL has four positions. Each position is defined by values for the four axes base, height and reach and by the angle of rotation twist about axis 56. For the particular application described herein, rotation of wrist 52 about axis 58 is not necessary and is therefore not specified in the table below. The positions are further modified by other factors such as GRIP defined as the distance between fingers of the tool and by FORCE defined as the force exerted by the robot on an object in the workcell.

TABLE 1

MOTION: GET.TOOL
TOOL: arm
FRAME:

| POSITION | BASE | HEIGHT | REACH | TWIST | GRIP | FORCE |
|---|---|---|---|---|---|---|
| 1 | 150.10 | 320.0 | 62.0 | 0.0 | " | " |
| 2 | 150.10 | 265.0 | 87.0 | " | " | " |
| 3 | 150.10 | 265.0 | 137.0 | " | " | " |
| 4 | 150.10 | 320.0 | 137.0 | " | " | " |

As shown in Table 1 above, the coordinates base, height and reach are all specified for the four positions in the motion "GET.TOOL". The values of the other three parameters are coordinate twist and factors GRIP and FORCE each specified only by a quotation mark. Specification of a factor by a quotation mark in the tables in this application means that the value of such factor remains unchanged from the previous position. If a quotation mark is specified for a coordinate or factor at the very first position, this means that the value of such coordinate or factor takes on the default or current value specified for the robot upon initiation of the motion. Thus, in Table 1 above, the values of twist, GRIP and FORCE take on their default values and remain unchanges throughout the motion.

Position 1 in Table 1 above is simply the present position of the robot at position 102 in FIG. 2. Maintaining the same base coordinate, the robot arm 54 moves downwards and extends its reach to position 104 so that it is at the appropriate height for getting a tool. Position 104 thus illustrates position 2 in Table 1 above. The robot then proceeds to position 3 in Table 1 above by maintaining the same coordinates of base and height but extends its reach towards the tool rack 38 until wrist 52 is connected to a tool 120 where arm 54 is at position 106. Actuation point 40 may be defined as a point between fingers 122 of tool 120. Thus, position 106 in FIG. 2 illustrates position 3 of Table 1 above. After wrist 52 is securely connected to tool 120 in a conventional manner, the robot arm 54 then moves to position 4 in Table 1 above, or position 108 in FIG. 2. The motion "GET.TOOL" is then completed.

The above-described motion "GET.TOOL" must be first defined using keyboard 18 or pendant 20 before the motion can be repetitively performed by robot 10. In defining the motion, each of the four positions is stored in controller 16, including the coordinates of each of the four positions together with attribute FORCE the motion is therefore completely specified by teaching and storing the three coordinates of each position together with the three attribute values. For the purpose of defining the motion, there is no differences between a coordinate and a factor such as GRIP. For this reason, factors may also be referred to as coordinates below. The attribute FORCE is referred to herein as position attribute. In other words, a motion is completely specified by specifying the position and the position attributes of such positions. While three position attributes are illustrated in the example, it will be understood that a different number of position attributes may be used and are within the scope of the invention.

The functions of control system 14 of FIG. 1 in defining a motion is illustrated in the flow chart of FIG. 5, in item I. Thus, the name of the motion is first selected (Block 150). For the motion in Table 1 above, the name selected for the motion is "GET.TOOL". Next, default values for the various attributes such as FORCE as set for the system (Block 152). The four positions of Table 1 are then defined using pendant 20 or by typing in the values of the coordinates using keyboard 18 (Block 154). The coordinates and position attribute values may be edited using either the pendant or the keyboard where necessary (Block 156). The motion consisting of the sequence of positions with attributes for getting a tool may then be stored in controller 16 (Block 158) so that the named motion can be reusable.

Next, robot 10 may be taught to pick up a test tube 160 from rack 32 in a manner similar to the motion "GET.TOOL". If the intended use of the tool is to pick up a test tube, the tool selected in "GET.TOOL" should be a suitable gripper.

Next, robot 10 and controller 16 are taught to pour the contents of test tube 160 into a beaker 34 through motion "pour" illustrated in Table 2 below in reference to FIG. 3.

TABLE 2

MOTION: POUR
TOOL: TOOL OBTAINED IN "GET.TOOL"
FRAME:

| POSITION | BASE | HEIGHT | REACH | TWIST | GRIP | FORCE |
|---|---|---|---|---|---|---|
| 1 | 150.10 | " | " | 0.0 | " | " |
| 2 | 148.90 | " | " | 20.0 | " | " |
| 3 | 147.00 | " | " | 50.0 | " | " |
| 4 | 145.80 | " | " | 90.0 | " | " |

TABLE 2-continued

MOTION: POUR
TOOL: TOOL OBTAINED IN "GET.TOOL"
FRAME:

| POSITION | BASE | HEIGHT | REACH | TWIST | GRIP | FORCE |
|---|---|---|---|---|---|---|
| 5 | 144.60 | " | " | 120.0 | " | " |
| 6 | 150.10 | " | " | 0.0 | " | " |

The same steps of blocks 150-158 of FIG. 5 may be used to define the motion for "POUR". As shown in Table 2 above, the height and reach of the actuation point of the robot does not change throughout the motion. The robot wrist 52 rotates from 0 degrees in position 1 to 120 degrees in position 5, through intermediate positions 2-4 and angles 20 degrees, 50 degrees and 90 degrees illustrated in Table 2 and FIG. 3 in order to empty the contents of the test tube into beaker 34. In position 6 wrist 52 is rotated back to its original position. When wrist 52 rotates the test tube using its wrist, the mouth of the test tube would follow a circular path about the actuation point 40. If the actuation point 40 remains unchanged throughout the motion, this may cause the contents of test tube 160 to be poured onto the table instead of into beaker 34. For this purpose it may be desirable to change the base coordinate of the actuation point slightly as illustrated in Table 2 and FIG. 3 so that the mouth of the test tube remains above the mouth of beaker 34 for receiving the test tube contents. The position attributes GRIP and FORCE do not change. The value of attribute GRIP is that set during the motion for picking up the test tube and is such that test tube 160 will not slide out between fingers 122.

TABLE 3

MOTION: PLACE.TEST.TUBE.IN.BALANCE
TOOL: gripper
FRAME: balance 1

| POSITION | BASE | HEIGHT | REACH | TWIST | GRIP | FORCE |
|---|---|---|---|---|---|---|
| 1 | 140.10 | 319.0 | 187.0 | 0.0 | " | " |
| 2 | 140.10 | 319.0 | 267.0 | 0.0 | " | " |
| 3 | 140.10 | 229.0 | 267.0 | 0.0 | " | " |
| 4 | 140.10 | 229.0 | 267.0 | 0.0 | 100 | " |
| 5 | 140.10 | 340.0 | 267.0 | 0.0 | 100 | " |
| 6 | 140.10 | 340.0 | 187.0 | 0.0 | 100 | " | for placing the test tube on the balance 36. As in FIG. 3, the positions 1-6 are used to label the robot position in FIG. 2. Thus, position 1 in FIG. 4 marks the initial position of the motion. Then, keeping the same base and height coordinates, the robot arm moves forward extending its reach to position 2. Next, the robot arm moves downwards to position 3 placing the test tube 160 into rack 162 placed on balance 36. Then position 4 is executed where the position of the robot arm and tool remains unchanged but its grip opens along arrows 164 so that its grip increases to the value 100. This releases the test tube from the grip by fingers 122. The robot then moves the arm to position 5 and is then withdrawn to position 6. It is noted that the attribute GRIP changes at position 4. In other words, the position attribute is designed so that the test tube is released at position 4.

The four motions necessary to accomplish the purpose of getting a robot tool, picking up a test tube, pouring the contents of the test tube into a beaker and the test tube in the balance have been defined. At any time after the four motions are defined and before the motions are executed, it is possible to recall the motions and edit them where necessary. This is illustrated for example in Table 4 below.

TABLE 4

MOTION: PLACE.TEST.TUBE.IN.BALANCE

| POSITION | BASE | HEIGHT | REACH | TWIST | GRIP | FORCE |
|---|---|---|---|---|---|---|
| Present Position: | | | | | | |
|  | 140.1 | 340.0 | 107.0 | 0.0 | 100 | 0 |
| FRAME: balance 2 | | | | | | |
| 1 | 140.1 | 319.0 | 187.0 | 0.0 | " | " |
| 2 | 140.1 | 319.0 | 267.0 | 0.0 | " | " |
| 3 | 140.1 | 267.0 | 267.0 | 0.0 | " | " |
| 4 | 140.1 | 267.0 | 267.0 | 0.0 | " | " |
| 5 | 140.1 | 340.0 | 267.0 | 0.0 | 100 | " |
| 6 | 140.1 | 340.0 | 187.0 | 0.0 | 100 | " |

1 Move to
2 Delete
3 Change#
4 Don't Care
5 ReOrder#
6 Reverse
7 Cancel
8 Done

The motion "PLACE.TEST.TUBE.IN.BALANCE" is illustrated in reference to Table 3 above and FIG. 4. As shown in Table 3, the base coordinate of the 6 positions in the motion do not change and are such that the gripper tool is slightly to the left of beaker 34

For the purpose of illustration, the motion "PLACE.TEST.TUBE.IN.BALANCE" is recalled. The motion that appears on a computer terminal screen may, for example, resemble Table 4 above. The present position of the actuation point is indicated and the 6 positions together with the position attributes are also listed. The motion can then be edited using function keys such as the 8 function keys listed in Table 4. Where it is desired that the fingers 122 release the test tube at position 5 instead of at position 4, for example, the GRIP attribute in position 4 can be modified to a quotation mark by pressing key 4 labeled "Don't Care". The operation of controller 14 in editing is illustrated in FIG. 5. First the motion is recalled (Block 200), and the motions are edited until it is satisfactory (BLock 202). The sequence of positions with attributes is then stored (Block 204).

As mentioned above, the use of other levels of attributes other than position attributes are useful for enhancing the capability and flexibility of the system. A motion attribute is one which applies to all the positions in the motion. Thus, in reference to Tables 3 and 4 all the positions are taught relative to a frame referred to in the tables as the frame of balance.1 (which is different from the frame shown in FIG. 1.). Thus, the values of base, height, reach, twist are defined in reference to the frame of reference of balance.1. Where it is desired to execute the motion in the frame of reference of a different balance, such as balance.2, it is possible to edit the motion attribute to "FRAME:balance.2" as shown in Table 4. When the motion attribute is so edited, exactly the same motion as taught can be performed in reference to balance 2 instead of to balance.1. In such manner the motion that has been taught for placing the test tube in balance.1 can be used to place the test tube in balance.2 instead by simply editing the motion attribute for FRAME. A user does not have to reteach the robot and the editing process does not involve robot movements. Hence, editing is possible while the robot is being used for other useful purposes. This eliminates the down time of the robot while editing is performed and improves the efficiency of the system.

Another type of attribute is known as axis or coordinate attributes, which refers to only a single attribute amongst the position attributes. For example, the quotation mark for position 1 for the attribute GRIP in Table 4 above indicates that the value of the attribute remains unchanged; this attribute is one of two position attributes for position 1 and is itself an axis or coordinate attribute.

Yet another type of attribute is known as the procedure attribute which is applicable for all the motions in the procedure. A somewhat different type of modifier is the motion attribute operator which can greatly enhance the capability and flexibility of the system.

To illustrate the invention, and in particular the functions of the various levels of attributes and of the motion attribute operator, a procedure comprising 7 procedure statements is described below for getting a tool, picking up a test tube and for placing it in a balance.

PROCEDURE

Example (1) This is an example of a procedure which illustrates the use of motions and the way the motion attribute operators and procedure attributes can be used to change the path of the motion at execution time TOOL IS NULL: sets procedure tool attribute to null tool GOTO.GRIPPER.STATION: motion (absolute) to go to where gripper tool is REL GET.TOOL: a generic 'GET.TOOL' motion done relative to current location TOOL IS GRIPPER: change tool attribute to 'gripper' unless overridden, future motions will use this tool MOVE.TO.TEST.TUBE: motion to go to a specific test tube REL PICK.UP.TEST.TUBE: generic pick up test at current location, this motion is linked to a special frame that includes the test tube location and the balance.

PLACE.TEST.TUBE.-: this motion has the balance frame

IN.BALANCE: attribute if the balance is ever moved, the motion does not have to be retaught, only the frame attribute needs to be changed First the procedure attribute for tool is set to null so that the robot proceeds without a tool, unless this command is overridden or modified later. Next controller 14 commands the robot to execute the motion "GO.-TO.GRIPPER.STATION". The robot then proceeds to where the gripper tool is, such as at rack 38 in FIG. 1. Then the controller executes the motion statement "REL GET.TOOL". The command REL is a motion attribute operator causing the motion "GET.TOOL" to be executed at the current location of the robot. Controller 14 recalls the motion "GET.TOOL" from memory (which may be taught in a manner described above) and executes the same motion at the current location of the robot.

The next procedure statement sets a procedure attribute, changing the procedure attribute for tool to "gripper", so that motions taught with a different tool can be performed subsequently with a gripper by accounting for the difference in offsets and geometries between the gripper and the teaching tool. Next the robot is commanded to execute the absolute motion MOVE.TO.-TEST.TUBE". The next procedure statement is another motion attribute operator "REL" for performing the motion "PICK.UP.TEST.TUBE" at the current location of the robot tool. Then the robot controller system executes the statement "PLACE.TEST-.TUBE.IN.BALANCE". As illustrated above, if the balance is ever moved, the motion needs not be retaught. The user needs only to change the frame motion attribute at the editing stage. Alternatively, this can be done by changing the last statement to read "PLACE.-TEST.TUBE.IN.BALANCE AT BALANCE.2", where balance 2 refers to the new position of the balance, and where the qualifier "AT BALANCE.2" would be a motion attribute operator.

Thus, as illustrated above, the invention provides a particularly powerful method for the user. Depending on the application desired, different rules can be designed by which the different levels of attributes modify one another in different manners. Thus, in the procedure illustrated above, instead of setting a procedure attribute by the statement "TOOL IS GRIPPER", it is possible to modify each of the four subsequent statements by adding a position attribute "with gripper". If the rule for the precedence of different levels of attributes is such that a position attribute overrides a procedure attribute, the position attribute "with gripper" in the subsequent statements will override the procedure attribute "TOOL IS NULL". Hence, the four subsequent statements will then be executed compensating for the fact that the tool used is a gripper. Thus, one rule for the precedence of different levels of attributes useful for some applications will be as follows (in descending order):

MOTION ATTRIBUTE OPERATOR

AXES OR COORDINATE ATTRIBUTE DEFINITION
POSITION ATTRIBUTE AT DEFINITION
PROCEDURE MOTION ATTRIBUTES
MOTION ATTRIBUTE AT DEFINITION

In the rule above, a motion attribute operator will take precedence over all other attributes. An axis attribute will take precedence over a position, procedure or motion attribute. A position attribute will take precedence over procedure and motion attributes, and a procedure motion attribute will take precedence over a motion attribute at definition. Another useful rule is similar to the one above but with the procedure motion attributes and motion attributes at definition interchanged in position in the hierarchy.

Another precedence rule which may be useful is as follows (in descending order):
POSITION TOOL ATTRIBUTE
MOTION TOOL ATTRIBUTE OPERATOR
PROCEDURE TOOL ATTRIBUTE
MOTION TOOL ATTRIBUTE The above precedence rules may be particularly useful where a procedure calls for the use of different tools in different motions. For example, a motion "MOVE" may have four positions. The motion tool attribute is "small gripper". The first two positions do not indicate a tool attribute so that the motion tool attribute applies. In other words the first two positions will be executed using a small gripper. The last two positions have position tool attributes of "NULL TOOL". According to the above rule, a position tool attribute takes precedence over a motion tool attribute, so that the last two positions will be executed without a tool.

The execution of a procedure is illustrated by the flow charts of FIGS. 5 and 6. First, a procedure is created or edited to combine motions already taught, a set procedure attributes and apply attribute operators (block 212). Thus, a set of procedure statements is created such as those discussed above for getting a gripper, picking up a test tube, and placing the test tube in the balance. As illustrating by the above example, motion attribute operators operating on a motion such as "REL" is applied to a procedure statement. Procedure attributes such as "TOOL IS NULL" is set as well as other procedure statements. The procedure statements are then stored. The user is then ready to execute the procedure.

In execution, the user first parses and executes the user procedure statements stored (block 214). Controller 16 checks to see if a procedure statement contains a motion name (diamond 216). Procedure statements may contain statements other than those commanding motions, such as calculations and other useful operations. If the particular procedure statement contains no motion name, the controller checks to see if there is another procedure statement than needs to be parsed and executed, the system exits. If there is still a procedure statement that needs to be executed the system then checks the next procedure statement to see if it contains a motion name.

If the statement checked in diamond 216 does contain a motion name, the statement is parsed for attribute operators and motion name (block 220). The motion parameters are then recalled from a file or memory (block 222). The precedence rules for all attributes in the system are then applied to computer the coordinate values for each position in the motion. The robot is then moved according to the coordinate values (block 224).

After all the positions in a motion have been executed, controller 16 returns to check if there is still another procedure statement that needs to be parsed and executed (diamond 218).

In addition to the motion attribute operators discussed above, the following are other motion attribute operators which may be useful for controlling robot motion.

ATTRIBUTE OPERATORS

The following are typical and representative:
Tool: Will cause the motion to be executed so that the specified tool tip traces the same path as the tool tip that was used in defining the motion.
Frame: Will cause the motion to be executed relative to the specified frame rather than the frame that was used in defining the motion.
Relative: A relative operator will cause the motion to be executed relative to the current robot position.
Force: Will cause the specified axis (or all axes) to move until a specified force is being applied. Used as a position or motion attribute it specifies the force to be exerted along the trajectory defined by the previous and next position in the motion.
Velocity: Will cause the motion to be executed at the specified velocity. As an axis attribute only the specified axis is moved at that velocity.
Acceleration: Will cause the motion to be executed with the specified accelerations between positions
"No-Change": Will allow the motion to be executed with whatever values the specified axes currently have. (A similar "change" operator could also be defined.).
"Move-thru": When applied to a position in a motion, the robot will move through or near the specified point without stopping.
"Elbow": For articulated robot arms, this attributed specifies the state of the robot arm to be with either "elbow up" or "elbow down"
Reverse": When applied as a motion operator, the positions in the motion are to be executed in the reverse order from which the motion was defined.

The above description of method and system is merely illustrative thereof and various changes in the steps, and other details thereof may be within the scope of the appended claims.

We claim:

1. A method for controlling a mechanical manipulator using a controller, the method comprising:
   storing in the controller a procedure which includes an ordered sequence of motions, each motion including an ordered sequence of positions, each position including coordinates which define a location relative to each axis of movement for the mechanical manipulator, each of said procedure, motions, positions and coordinates defining an attribute level;
   storing a first and a second attribute operator, said two attribute operators pertaining to different attribute levels and affecting two or more attribute levels, said first attribute operator having a higher rank than the second according to a predetermined ranking rule based on a ranking of the attribute levels;
   comparing the attribute operators stored and selecting the attribute operator having a higher rank from a pair of attribute operators when the pair have conflicting influence on the procedure; and executing the stored procedure according to the stored attribute operators, except for any non-selected attribute operator when the selecting step occurs.

2. The method of claim 1, further comprising editing the procedure and at least one attribute operator before the executing step.

3. The method of claim 2, wherein the editing is performed without moving the manipulator.

4. The method of claim 1, wherein the predetermined ranking rule is such that a coordinate attribute operator has higher rank than a position attribute operator, that a position attribute operator has higher rank than a procedure attribute operator, and that a procedure attribute operator has higher rank than a motion attribute operator.

5. The method of claim 1, wherein the predetermined ranking rule is such that a coordinate attribute operator has higher rank than a position attribute operator, that a position attribute operator has higher rank than a motion attribute operator, and that a motion attribute operator has higher rank than a procedure attribute operator.

6. The method of claim 1, further comprising storing at least one additional attribute operator for the procedure, a motion, position, or coordinate already stored, before execution, where the additional attribute operator has higher rank than other attribute operators so that the procedure will be executed acording to the additional attribute operator in the executing step.

7. The method of claim 1, wherein one of the two attribute operators is a motion attribute operator, and wherein the motion attribute opertor is such that at least one coordinate of a position remains the same as the coordinate of a previous position in an ordered sequence of positions in a motion in the procedure.

8. The method of claim 1, wherein one of the two attribute operators is a relative motion attribute operator, wherein the positions of each motion are defined relative to a first reference frame, the method further comprising storing in the controller a second reference frame before the executing step, wherein the relative motion attribute operator causes the motion to be executed during the executing step in reference to the second reference frame instead of in reference to the first reference frame.

9. The method of claim 1, wherein one of the two attribute operators is a don't-change attribute operator which causes the controller to use the value of a previous coordinate instead of the coordinate's actual value.

10. The method of claim 1, wherein one of the two attribute operators is a force attribute operator which specifies a maximum value of force to be applied to that coordinate.

11. The method of claim 1, wherein one of the two attribute operators is a move-through attribute operator which causes the controller not to stop at a position, but which rather moves the mechanical manipulator through the position, when executed.

12. The method of claim 1, wherein one of the two attribute operators is a velocity attribute operator which defines a velocity of the entire motion or procedure.

13. The method of claim 1, wherein one of the two attribute operators is a frame attribute operator which defines a new frame of reference for the entire motion or procedure.

14. The method of claim 1, wherein one of the two attribute operator is a tool-offset attribute operator which defines a positional offset for the entire motion or procedure.

15. The method of claim 1, wherein one of the two attribute operators is an acceleration attribute operator which defines an amount of acceleration for the entire motion or procedure.

16. The method of claim 1, wherein one of the two attribute operators is a reverse attribute operator which causes the controller to execute an entire motion or procedure in reverse order.

17. The method of claim 1, wherein one of the two attribute operators is a relative attribute operator which cause the controller to execute an entire motion or procedure in a present frame of reference rather than the frame of reference the motion or procedure was defined in.

18. The method of claim 1, wherein one of the two attribute operators is a procedure or motion attribute operator, and wherein the procedure attribute operator or motion operator is a relative frame of reference attribute operator which, when executed by the controller, transforms the positions in the procedure or in a motion to a new frame of reference.

19. An apparatus for controlling a mechanical manipulator using a controller, the method comprising:
  means for storing in the controller a procedure which includes an ordered sequence of motions, each motion including an ordered sequence of positions, each position including coordinates which define a location relative to each axis of movement for the mechanical manipulator, each of said procedures, motions, positions and coordinates defining an attribute level;
  means for storing a first and a second attribute operator, said two attribute operators pertaining to different attribute levels and affecting two or more attribute levels, said first attribute operator having a higher rank than the second according to a predetermined ranking rule based on a ranking of the attribute levels;
  means for comparing the attribute operators stored and selecting the attribute operator having a higher rank from a pair of attribute operators when the pair have conflicting influence on the procedure; and
  means for executing the stored procedure according to the stored attribute operators, except for any non-selected attribute operator when the selecting step occurs.

* * * * *

UNITED STATES PATENT AND TRADEMARK OFFICE
CERTIFICATE OF CORRECTION

PATENT NO. : 4,843,566
DATED : June 27, 1989
INVENTOR(S) : Gordon, et al.

It is certified that error appears in the above-identified patent and that said Letters Patent is hereby corrected as shown below:

```
    Page 1, field [75] add Inventor -- Stuart D. Lerner --.

Column 1, line 49, "control and robot's" should read
-- control the robot's --.

Column 2, line 59, "speed , acceleration" should read
-- speed, acceleration --.

Column 2, line 60, "aobjects" should read -- objects --.

Column 2, line 65, "whoel" should read -- whole --.

Column 5, line 46, "unchanges" should read -- unchanged --.
```

Signed and Sealed this

Twenty-second Day of May, 1990

*Attest:*

HARRY F. MANBECK, JR.

*Attesting Officer*    *Commissioner of Patents and Trademarks*